Dec. 7, 1954     R. W. HUXTABLE     2,696,233
KEYHOLE SAW
Filed Nov. 14, 1950
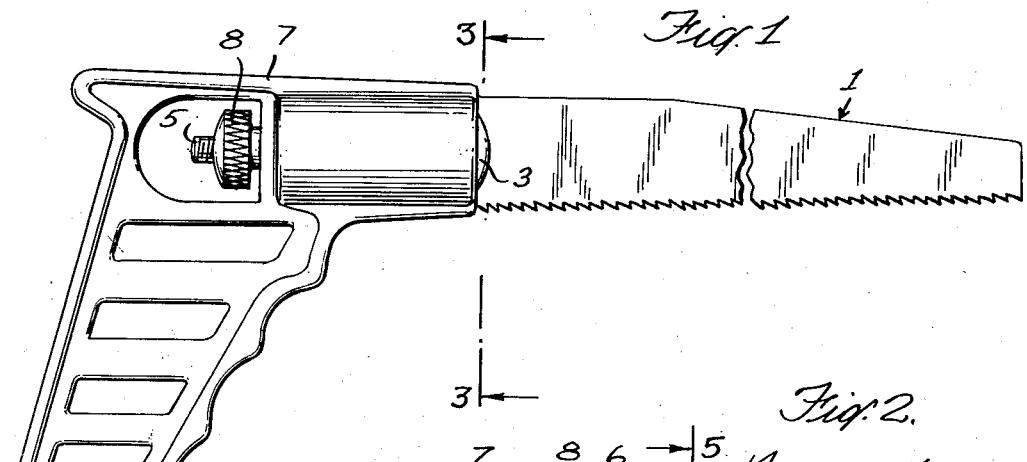
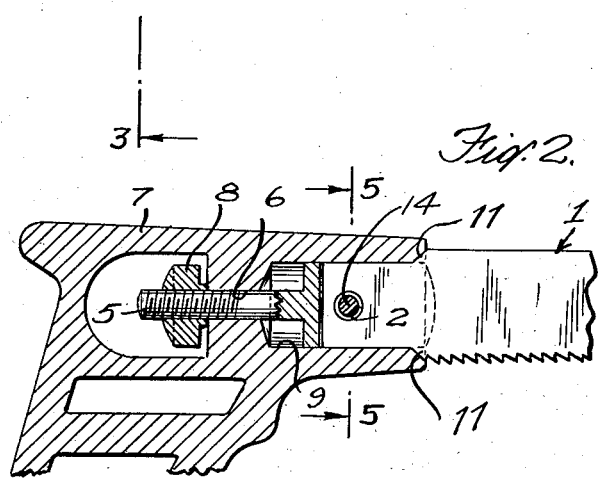
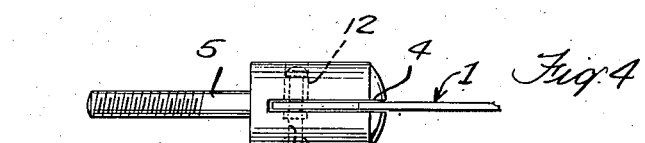
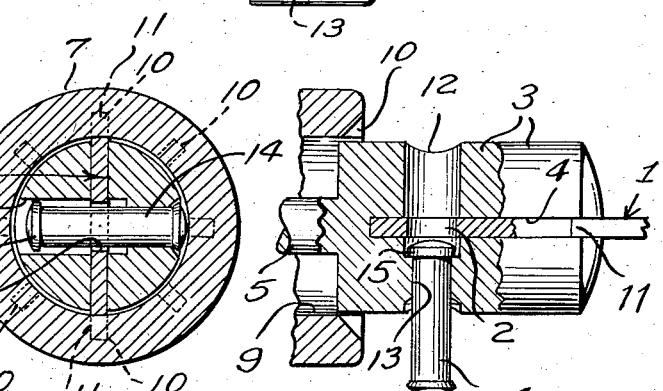
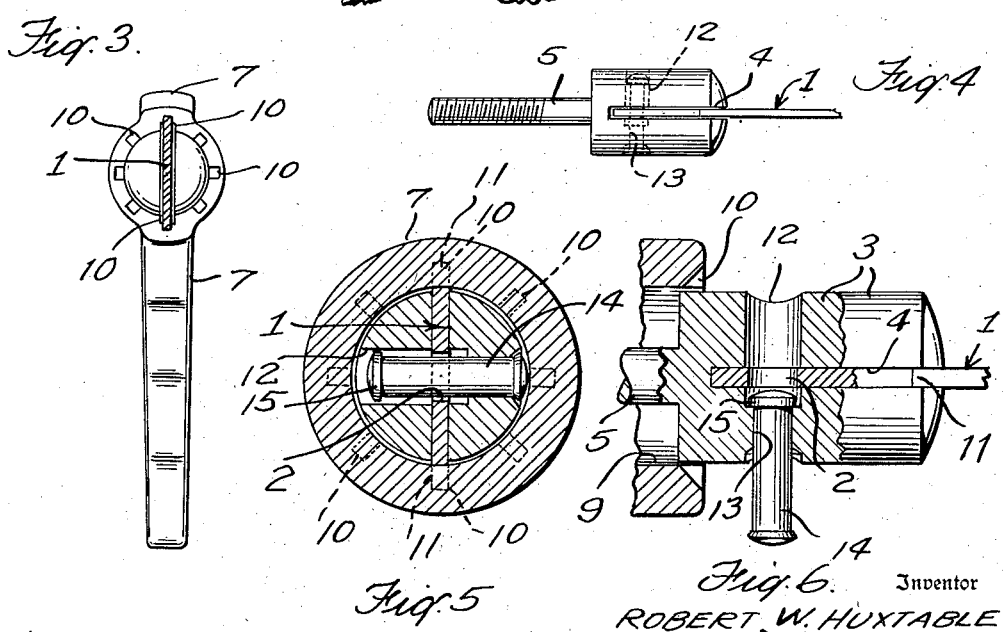
Inventor
ROBERT W. HUXTABLE
By Frederic P. Worfield
Attorney

United States Patent Office 2,696,233
Patented Dec. 7, 1954

2,696,233

KEYHOLE SAW

Robert W. Huxtable, Greenfield, Mass., assignor to Millers Falls Company, Greenfield, Mass., a corporation of Massachusetts Application November 14, 1950, Serial No. 195,589

1 Claim. (Cl. 145—108)

This invention relates to keyhole saw having blades which can be adjusted to different angles.

The main object of the invention is to provide a keyhole saw which may be easily and efficiently adjusted to positions at various angles and in which the blade may be readily removed and replaced.

Other objects of the invention will in part be obvious and will in part appear hereafter.

The invention accordingly comprises the features of construction, combinations of elements, and arrangement of parts, which will be exemplified in the construction hereinafter set forth, and the scope of the application of which will be indicated in the claim.

For a fuller understanding of the nature and objects of this invention reference should be had to the following detailed description taken in connection with the accompanying drawings, in which:

Fig. 1 shows a side elevation of the assembled saw.

Fig. 2 is partial section of the handle showing the means for attaching and adjusting the saw blade within the handle.

Fig. 3 is a section on the lines 3—3 of Fig. 1 looking in the direction of the arrows.

Fig. 4 is a detail showing the end of the saw blade and its holder.

Fig. 5 is a section on an enlarged scale on the lines 5—5 of Fig. 2 looking in the direction of the arrows.

Fig. 6 is a detail on an enlarged scale partially in section showing the position of the parts when the saw is to be inserted in its holder or removed therefrom.

The saw blade 1 has an opening 2 at its inner end and the holder 3 has a slit 4 for the reception of the end of the blade 1. This holder carries at its inner end a threaded stud 5 which passes through an opening 6 in the handle 7 and carries a nut 8, by turning which the holder 3 may be moved in either direction within the bore 9 in the handle 7. The other end of the handle 7 as shown in Figs. 3 and 5, is provided with notches 10 for holding the saw blade in any of eight adjusted angular positions thus permitted. Projections 11 on the saw blade fit into the notches 10 in any of the adjusted positions.

Holder 3 is provided as best shown in Fig. 6 with a bore therethrough of two dimensions as at 12 and 13. The opening 2 in the end of the saw registers with this bore when the saw is pushed home in the slit 4 as shown in Fig. 6.

A two-headed rivet 14 is reciprocably mounted within this bore and, as shown in Fig. 5, in one position it holds the saw blade in position within the holder and the handle. When it is desired to remove and replace the saw blade the holder 3 is screwed to the right by the adjusting nut 8 until it reaches the position shown in Fig. 6 when the rivet can fall down by gravity, its head 15 being smaller than the opening 2 in the end of the saw blade. The rivet can thus be moved, by hand to a holding position, and by gravity or otherwise to a free position, but cannot pass out of the holder and be lost because its upper end is larger than the smaller bore 13.

In operation as will be readily understood, the saw blade is adjusted to the position shown in Fig. 6 and the rivet is then moved up by hand to the position shown in Fig. 5. Then, by turning the adjusting nut 8 the holder with the saw is retracted into the bore in the handle and the rivet is then held in its holding position. It follows that the saw can be easily and efficiently adjusted and held in any of the eight positions shown and quickly replaced when necessary without danger of any of the parts becoming lost or getting out of position.

Since certain changes may be made in the above construction, and different embodiments of the invention could be made without departing from the scope thereof, it is intended that all matter contained in the above description or shown in the accompanying drawings shall be interpreted as illustrative and not in a limiting sense.

It is also understood that the following claim is intended to cover all of the generic and specific features of the invention herein described, and all statements of the scope of the invention which as a matter of language might be said to fall therebetween.

Having described my invention, what I claim is new and desire to secure by Letters Patent is:

In a saw in combination, a handle, a recess in said handle, a blade holder reciprocably mounted in said recess; said blade holder having a threaded stud carrying a nut for adjustment of said holder along said recess, a saw blade, an extension upon said blade which may pass into a slit at the end of said holder; a bore in said holder registering with an opening in the end of said blade, said bore being of two dimensions, a two-headed rivet fitted within said bore, having a head which will pass through said opening in said blade, but which is held at both ends from passing out of said bore; a plurality of notches in the outer end of said handle within which notches the saw blade fits for adjustment to a plurality of adjusted angular positions.

References Cited in the file of this patent

UNITED STATES PATENTS

| Number | Name | Date |
| --- | --- | --- |
| 292,176 | Pratt | Jan. 22, 1884 |
| 327,776 | Eisenhardt | Oct. 6, 1885 |
| 562,787 | Ammon | June 30, 1896 |
| 607,700 | Oldham | July 19, 1898 |
| 966,570 | Locke | Aug. 9, 1910 |
| 1,260,198 | Holmes | Mar. 19, 1918 |
| 2,435,225 | Kolodner et al. | Feb. 3, 1948 |

FOREIGN PATENTS

| Number | Country | Date |
| --- | --- | --- |
| 88,867 | Sweden | Mar. 23, 1937 |